(12) United States Patent
Swedor et al.

(10) Patent No.: US 8,032,750 B2
(45) Date of Patent: Oct. 4, 2011

(54) METHOD FOR ESTABLISHING A SECURE E-MAIL COMMUNICATION CHANNEL BETWEEN A SENDER AND A RECIPIENT

(75) Inventors: Olivier Swedor, Zurich (CH); Marcel Mock, Zumikon (CH)

(73) Assignee: Totemo AG, Kusnacht (CH)

( * ) Notice: Subject to any disclaimer, the term of this patent is extended or adjusted under 35 U.S.C. 154(b) by 1277 days.

(21) Appl. No.: 11/599,869

(22) Filed: Nov. 15, 2006

(65) Prior Publication Data

US 2007/0130464 A1    Jun. 7, 2007

(30) Foreign Application Priority Data

Nov. 16, 2005   (EP) .................................... 05110836

(51) Int. Cl.
*H04L 9/00* (2006.01)
*H04L 29/06* (2006.01)
(52) U.S. Cl. ........................ 713/170; 709/206
(58) Field of Classification Search ................. 713/170
See application file for complete search history.

(56) References Cited

U.S. PATENT DOCUMENTS

2004/0015610 A1* 1/2004 Treadwell ..................... 709/246
2004/0025057 A1* 2/2004 Cook ............................ 713/201

FOREIGN PATENT DOCUMENTS

EP    1 536 601 A1   6/2005
GB    2 400 284 A    10/2004

* cited by examiner

*Primary Examiner* — Gilberto Barron, Jr.
*Assistant Examiner* — Devin Almeida
(74) *Attorney, Agent, or Firm* — Pearne & Gordon LLP

(57) ABSTRACT

A method for establishing a secure e-mail communication channel between a sender (10) and a recipient (5), wherein:
1) said sender sends an e-mail addressed to said recipient over an e-mail encryption system (16),
2) said encryption system (16) verifies in a database (160) of recipients if a public key of said recipient is available,
3) if said public key of said recipient is available, said encryption system encrypts said e-mail with said public key, and forwards the encrypted e-mail to the recipient (5),
4) if, on the other hand, said public key of said recipient is not available in said database (160), said encryption system sends instead enrolment message (1220) to said recipient, said enrolment message containing an invitation for said recipient to choose among one of the following options:
i) access to said email over a secured web mail interface, or
ii) sends a reply to said encryption system from which said public key can be extracted, or
ii) initiate generation of a public key on the recipient's side.

38 Claims, 8 Drawing Sheets

1220

1260

1260

METHOD FOR ESTABLISHING A SECURE E-MAIL COMMUNICATION CHANNEL BETWEEN A SENDER AND A RECIPIENT

RELATED APPLICATIONS

The present invention claims priority of European Patent Application EP05110836.3, filed on Nov. 16, 2005, the content of which is enclosed by reference.

FIELD OF THE INVENTION

The present invention relates to an encryption method for emails sent from a sender to a recipient, and to an encryption system. The present invention also relates to the establishment of a secure channel for email transmission between an email relay on a private network and an external recipient.

DESCRIPTION OF RELATED ART

End-to-end email encryption solutions are already known in the prior art, in which emails are encrypted by the email client of the sender and decrypted by the email client of the recipient. Security is based on the exchange of certificates between each sender and each recipient. If many users within a company send emails to a same recipient, the process of retrieving the certificate of the recipient has to be repeated by each sender, which is time consuming both for the sender and for the recipient. Furthermore, storing the recipient's certificates in each sender email client necessitates some backup precautions.

Moreover, this solution makes it impossible to scan at a central place in the local area network the emails for viruses or to enforce any content-checking on them, since they are encrypted. This means a significant loss of control for the company on what is sent to or received by its users, be it offensive content, confidential content, viruses, etc.

In addition, end-to-end encryption methods do not allow delegation rules in the company email server to be defined anymore. Delegation allows a user or a group of users to receive emails originally destined to somebody else. Since the emails are encrypted with the certificate of the original recipient, the user or group of users to which the email is delegated will not be able to decrypt it.

In order to overcome some of those drawbacks, solutions for the central storage of recipients' certificate in a company network are already known. An example of such a solution is offered, among others, by the applicant under the commercial name Trustmail (registered trademark of the applicant). Various improvements; allowing an end-to-end confidentiality, are furthermore described in EP1536601 filed by the applicant.

In those prior art solutions, an encryption system is installed within the sender company's private network. Outgoing emails are encrypted by the encryption system, which centrally stores the certificates of all recipients, before they travel the Internet. The encryption server insures that no confidential email leaves the company private network unprotected, and offers a great comfort to users within the company.

However, in this prior art solution, the security is based on the availability in the encryption system of an encryption key of the recipient. For example, if an asymmetric encryption scheme is used, the encryption system needs the public key of each recipient to which encrypted outgoing mails should be sent. Solutions are already available in which a request for the recipient's certificate is automatically sent by the sender's email client when the sender sends an email that should be encrypted to a new recipient, i.e. a recipient for which no valid certificate is available. However, such a request can only be answered if the recipient has such a certificate readily available, if he is able to understand the request, and if he indeed accepts to communicate his public key to the sender.

The present invention thus concerns in particular a method for securing emails to recipient for which no encryption key (or public key) is readily available. The present invention moreover concerns a method for establishing a secure communication channel for e-mails between an email relay and a recipient.

The above mentioned patent application EP1536601 also suggest the possibility for the encryption system on the sender's side to generate and transmit new certificates to recipients whose public keys are unavailable. Apart from the fact that the recipient does not want to receive and install such a certificate, the generation of a pair of keys on the sender's side has also the drawback that the sender will know the private key of the sender. This may be undesirable, as the sender could fraudulently use this private key to sign emails on behalf of the recipient.

The present invention thus concerns a method for establishing a secure communication channel for e-mails between an email relay and a recipient, wherein the recipient can decide how the emails should be secured, and wherein no private key of one party is communicated to the other party.

According to the invention, those aims are solved among other with a method for establishing a secure e-mail communication channel between a sender and at least one recipient, wherein an encryption system on the sender's side sends an enrolment message to said recipient, said enrolment message containing an invitation for said recipient to choose among one of the following options:

i) access to said e-mail over a secured web mail interface, or ii) sends a reply to said encryption system from which said public key can be extracted, or iii) initiate generation of a public key on the recipient's side.

In an embodiment, the sender first sends an e-mail addressed to said recipient over the encryption system, for example in an email relay. The encryption system in the email relay verifies in a database of recipients if a public key of the recipient is available; if the public key of the recipient is available, the encryption system encrypts the e-mail with the public key, and forwards the encrypted e-mail to the recipient. If, on the other hand, the public key of the recipient is not available in the database, the encryption system sends instead said enrolment message to the recipient, inviting him to choose among the above mentioned options for establishing the secure channel.

This has the advantage that the recipient can decide how he wants to access the content of the secured email, and if he wants to generate a new certificate for this purpose. If he wishes so, the certificate will be generated on his side, for example by its email client application, and the public key of the certificate will be sent to the email relay on the sender's side. If he already has a certificate, he can just reply to the invitation email with a signed email from which the relay on the sender's side will extract the public key needed for encryption of the email to secure. If no email encryption is wanted or possible, the recipient can still decide, preferably with a single click, to access to the content of the secured email over a secured Webmail interface.

The response to the enrolment message can be manually prepared and sent by the recipient, or can also be automatic. In this case, a compatible device or software on the recipient's side will automatically recognize the enrolment message as such and prepare an appropriate answer, for example in order to send a public key or to request generation of such a public key.

This also has the advantage that emails can be sent in a normal way, as the sender does not need to know the certificate of the recipient, and does not even need an email client that can encrypt email: the whole encryption task is delegated to a dedicated email gateway.

This also has the advantage that the whole setup process, including the generation of key pairs and their installation in the email clients, is performed or at least assisted by the encryption system. Furthermore, a central directory of recipients' addresses and certificates can easily be installed or made accessible to the encryption system.

According to another, possibly independent aspect fo the invention, a user can define a list of recipients forming a group within which secure emails should be exchanged. An enrolment email is then sent to each member of the group, allowing them to communicate a certificate they want to use for securing emails exchanged with other members, and/or to generate a new certificate. As soon as sufficient group members would have created their certificate or communicated an existing one all members would receive an email containing contact details to be directly imported in their email client address book, possibly including the certificates. Encryption of emails exchanged within members of the group can then be performed using the email clients of the senders, or alternatively through the central encryption system that stores all certificates.

According to yet another aspect, possibly independent aspect of the invention, emails sent by a user is held back in a relay, for example in the encryption system, and a notification is sent by email to the sender, or to another party, to let him release the email or decide how the email should be processed, for example if it should be encrypted and/or signed.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
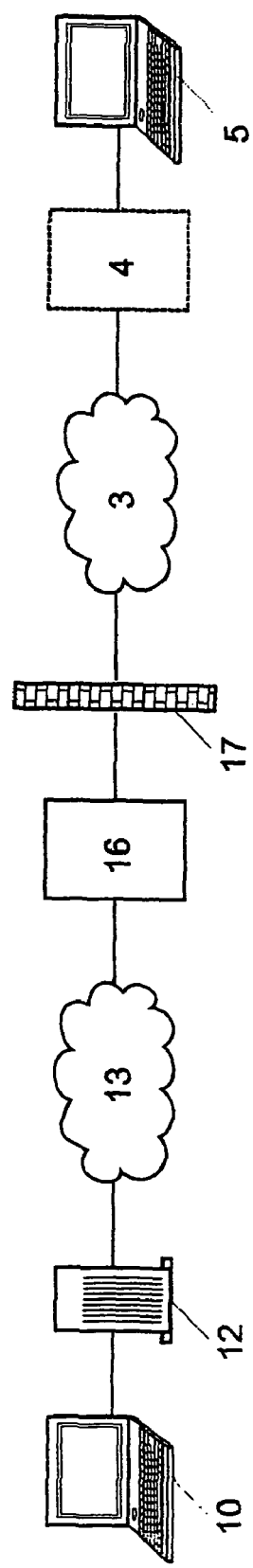
FIG. 1 shows a diagrammatic view of a system according to the invention.

In the following section of the description and in the claims, when we talk about a "private network", it can be a local area network (LAN), a plurality of mutually connected local area networks, a VPN (virtual private network), or a plurality of mutually connected LANs and/or VPNs and/or WLANs. Thus, parts of the network may be public; a feature of the private network is however that it must be possible to install in the network an encryption system which will be able to decrypt secure emails; a relationship of trust must therefore exist between all users of the private network and the administrator of the trusted encryption system. In most embodiments, the private network has an administrator that also administrates the encryption system.

When we say "certificate" or "public key", we mean the same, except when specifically stated. To encrypt data using symmetric and/or asymmetric encryption, the public key of the recipient of the data is needed. A certificate is simply a public key with some information attached. Different technologies use different terminology, with S/MIME the word "certificate" is usually applied whereas with PGP the term "public key" is applied.

When we say "encryption system", we mean not only the software and/or hardware module that actually performs encryption, but a complete server system for processing and encrypting emails. Depending on the embodiment, the encryption system can for example include an encryption gateway, an email relay or an email server, an address directory, a directory proxy, etc. Those different components of the encryption system may be implemented by one or several software modules and/or one or several hardware modules, for example one server, one Internet security appliance, or a group of mutually connected servers.

We usually use the term encryption gateway, or secure gateway, to designate the part of the encryption system that actually generates and delivers certificates, decrypts and encrypts incoming and outgoing emails, etc. The encryption gateway may be implemented by one or several modules running on one or several servers, by one appliance, or possibly by an application executed by the computer of the sender. The administrator of the encryption gateway is trusted by all sending users using the gateway, for example by all users within a private network.

"Internal users" are users inside the private network where the system is installed, for example the employees of the company using the system, users connected to a common local area network or group of local area networks, or clients of an Internet Service Provider or of a value-added service provider using the system.

When we talk about encryption, it can be any symmetric and/or preferably asymmetric encryption technology (for example S/MIME, PGP, etc.), in which emails are encrypted by the recipient certificate and decrypted by the corresponding private key. Emails may also be signed with the sender's private key, thus allowing recipients to check the authenticity of the message with the corresponding certificate.

When we say "directory", we mean a directory or database preferably running on a server within the private network and containing user information, for example user email addresses and certificates. Any kind of protocol or language can be used to access it (LDAP, SQL, etc.).

When we say email, we mean conventional SMTP emails as well as equivalents such as instant messages or other digital messages which can be sent and received with message clients running on user computers or mobile phones.

FIG. 1 shows an email server including an encryption system 16 installed within the sender company's private network 13 and directly connected to a firewall 17. The company private network 13 comprises a plurality of email clients 10 mutually connected with non illustrated hubs and/or switches. The network may also comprise an optional email server 12, such as a Microsoft Exchange or Lotus Notes server, and an additional email gateway (not shown) for computing various statistics and for performing security tasks on the outgoing email, such as virus and offensive content detection, spam filtering, etc. An encryption system 16 on the sender's side comprises or is made up of an encryption gateway that generates and delivers certificates, decrypts and encrypts incoming and outgoing emails, etc For additional security, the encryption gateway 16 and/or the additional email gateway may be separated from the email client of the sender by an additional firewall, or located in a demilitarized (DMZ) portion of the network 13.

Encrypted emails that leave the firewall 17 are forwarded through the Internet 3 and received by an email client 5 in the network of the recipient, possibly over an email gateway (not shown) and/or over an email encryption system 4, similar to encryption system 16 on sender's side.

The encryption gateway in the encryption system 16 is responsible for generating, collecting and distributing encryption certificates and for ensuring that no confidential email leaves the company private network 13 unprotected. The encryption system may be built around a conventional SMTP (Simple Email Transfer Protocol) relay, or any other kind of suitable email relay, which can easily be integrated in an existing infrastructure. The only change involving the existing infrastructure components is the existing email server 12 must forward outgoing emails to the encryption gateway 16 instead of sending them to the Internet 13 directly.

Figure 2:
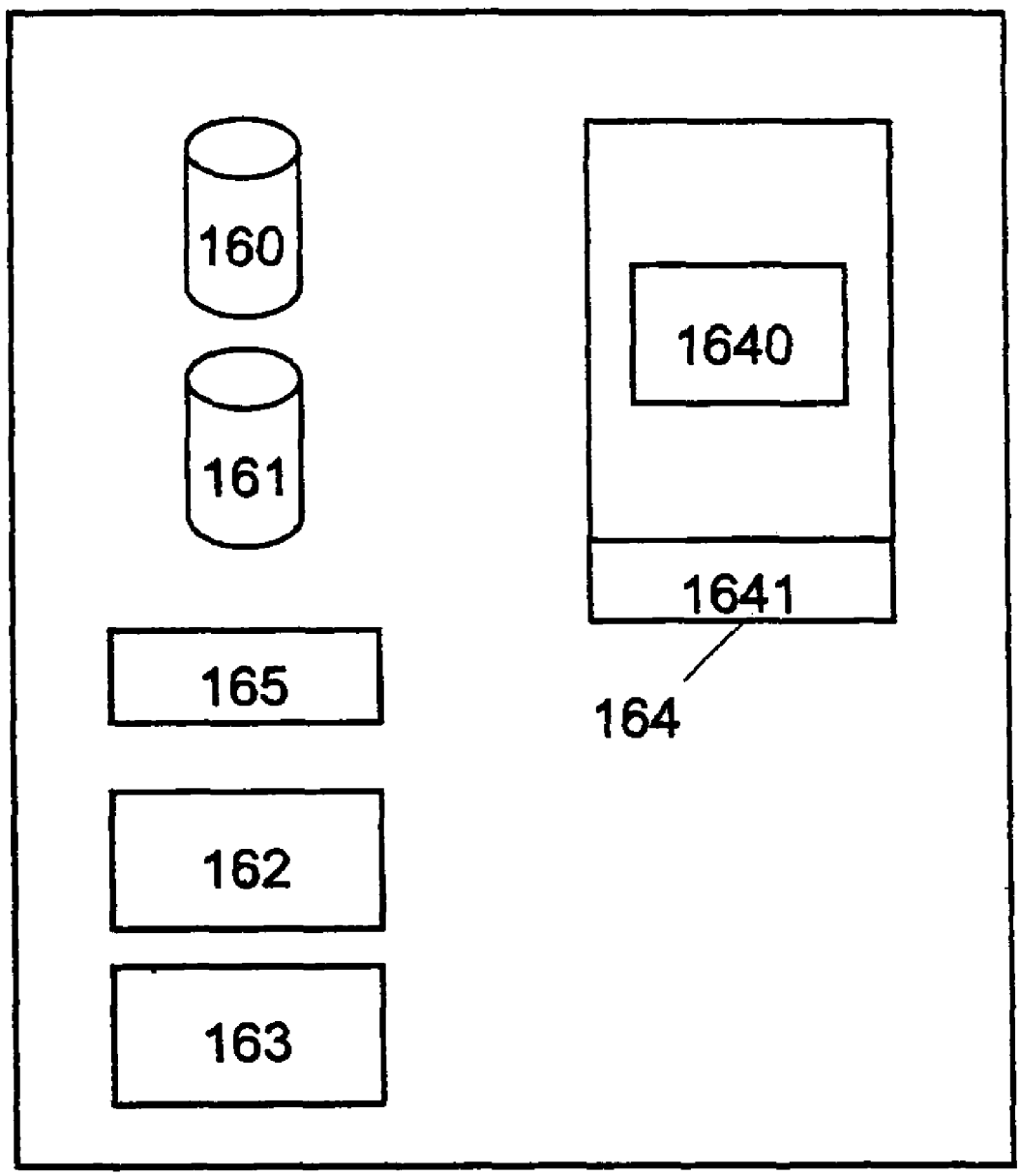
FIG. 2 shows a diagrammatic view of an email relay according to the invention.

FIG. 2 illustrates in diagrammatic form an example of encryption gateway or system 16 that could be used within the system of the invention. The encryption system comprises software and hardware components, for example one or several software applications running on an operating system, such as Windows Server or Linux, executed by an appropriate server or group of servers in one computer domain, or in separated domains within the private network of an organization. The applications comprise at least one database 160 for storing profiles of recipients, including for each recipient to which secured email should be sent at least the email address and a public key or certificate, for example a PGP public key or an S/MIME certificate. The profile may also contain each recipient's name, and preferences such as individual criteria for securing or not securing emails, preferred encryption method, preferred language, etc. In one embodiment, the recipient database 160 is made up of a directory such as a LDAP (Lightweight Directory Access Protocol) directory.

The encryption gateway further comprises a buffer 161 for temporary storage of outgoing emails before encryption and while the public key of the recipient is retrieved. This buffer is preferably made up of a directory or email folder managed by an email gateway or server. In another embodiment, emails may be held in a database structure.

A policy enforcement module 165 in the encryption gateway is responsible for deciding if an outgoing email should be secured, whereas the decision preferably depends on an editable security policy defined in a database 165. The security policy contains a list of conditions and filters depending on the organization and defining how outgoing emails should be handled, and which emails should be secured. For example, it may be possible to define that only outgoing emails explicitly marked as "confidential" or containing the word "confidential" or "proprietary" in the subject-line will be secured. In a preferred embodiment, the policy in the database may be edited by the administrator of the encryption system 16 over a dedicated web page.

A certificate generation module 162 in the encryption gateway initiates the generation of new certificates for recipients who request it. The certificate generation module 162 is preferably made up of a Public Key Infrastructure (PKI), for example a X.509 based PKI, and can create, renew and revocate certificates. The encryption system may also be connected to an existing, external PKI application, using for example PKCS#10 certificate requests and/or any suitable PKI toolkit.

A cryptographic module 163 in the encryption gateway performs the actual encryption of outgoing secured emails with the public key of the recipient, possibly the decryption of incoming encrypted emails, and possibly the signature of outgoing emails with the private key of the company and/or of the internal sender (if available). Outgoing emails may also be signed within the email client of the sender. The security is preferably based on pairs of asymmetric keys, preferably using S/MIME and/or PGP. In a preferred embodiment, both protocols can be used within the same system 16 and the system choose the most appropriate protocol for each recipient and possibly for each communication.

The encryption system 16 further preferably comprises a web server 164, or can prepare content made available over the World Wide Web by an external Web Server. This content can be retrieved by external Internet users connected to the web server 164 over the Internet.

The web server 164, or corresponding internal and external Web publishing means executes a Webmail application 1640 that allows external email recipients to check and retrieve the content and attachments of their emails in the buffer 161. Access to the Webmail application is preferably secured, possibly using a SSL certificate 1641 in the Web server. Once an email has been retrieved by its external recipient, it is preferably automatically removed from the buffer 161. Other policies for storage and removing of emails from the buffer 161 are also possible.

The web server 164 or corresponding Web publishing means may further offer Web forms allowing internal and possibly external users to introduce a list of recipients defining a group within which secure emails should be exchanged. The list of recipients may be introduced manually, for example as a list of email addresses on a web form, or entered as a file, such as a XML file, a comma-separated file, a spreadsheet file, as a list of entries from a LDAP or active directory, or as a list of entries retrieved from a database and uploaded or communicated by any other means to be encryption server.

Figure 3:
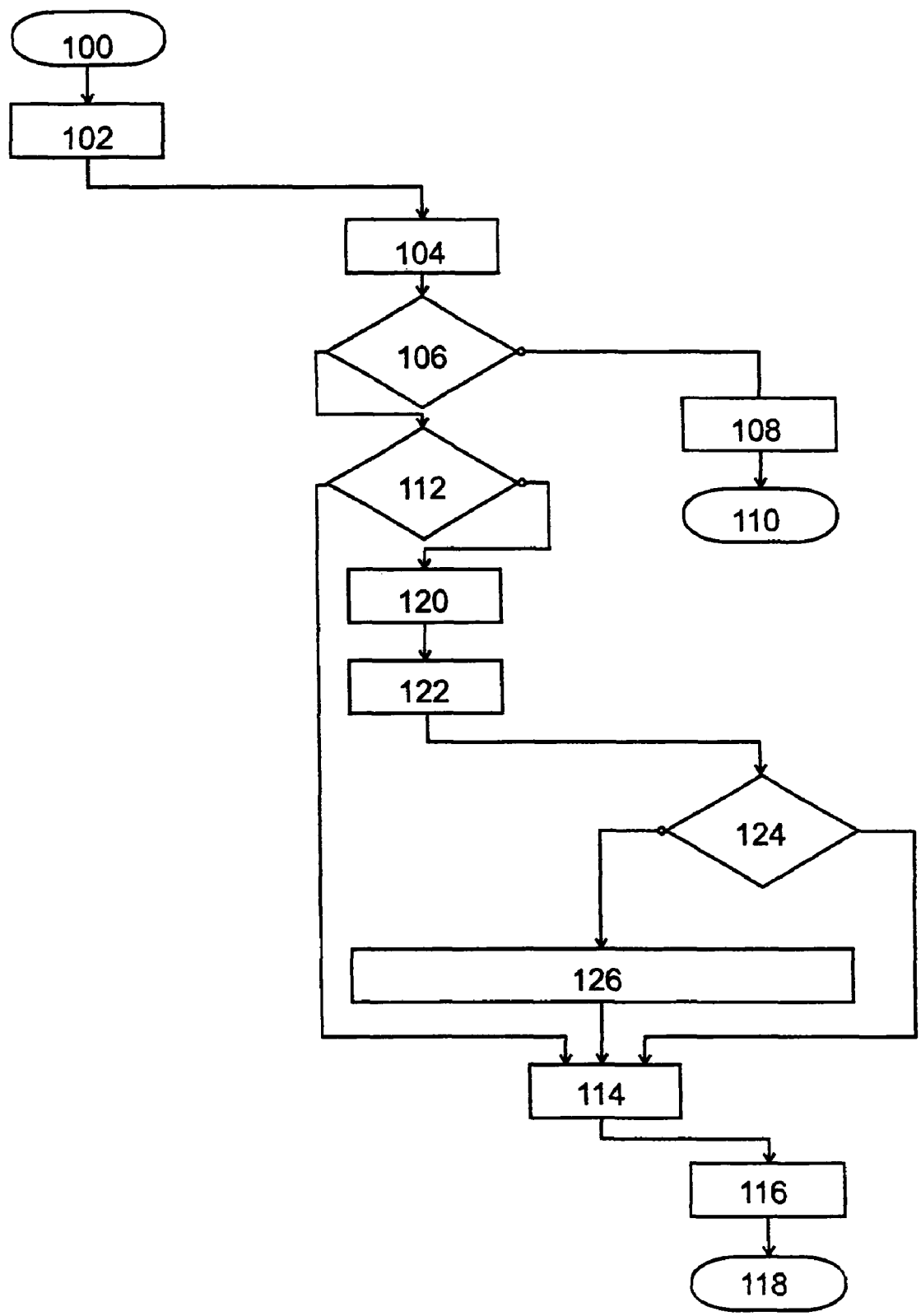
FIG. 3 illustrates the process that takes up when an internal sender sends an outgoing email to an external recipient.

FIG. 3 illustrates the process that takes place when an internal user sends an outgoing email to an external recipient. The process starts at step 100. At step 102, the user sends an email from his personal computer in the private network of his company, using a conventional email client such as, for example, Outlook, Outlook Exchange (both Trademarks of Microsoft), LotusNotes (trademark of IBM), Eudora, or any other suitable email client. At step 104, the email is intercepted by the email relay in the encryption system 16. The email relay is for example an email gateway or an email server, preferably in the private network of the company, in a demilitarized domain connected to this domain, or possibly run by an Internet Service Provider with which the sender has a subscription. The email is temporarily stored in a suitable buffer 161, for example in a temporary directory for outgoing emails of the email relay.

Virus and offending content checks, spam control and statistics may be performed on emails temporarily stored in the encryption system 16, or at any other stage.

At step 106, the encryption gateway 16 checks if the email fulfils predefined conditions and rules defined with a policy enforcement module. If the conditions are not fulfilled, i.e. if the outgoing email does not require encryption or other cryptographic measures at this stage, it is directly sent, without encryption, to the intended recipient, who receives it during step 108. The process then stops at step 110.

If, on the other end, the policy enforcement module 165 of the encryption 16 determines that the company policy indeed requires encryption of the outgoing email, a test is made at step 112 to verify if the public key of the recipient is available in the database 160 or possibly at another place. If the recipient's public key needed for encryption can be retrieved, the email is encrypted with this key during stage 114, and the encrypted, secured email is forwarded to the recipient who receives it during step 116. The process then stops at step 118.

In an embodiment, the test made at step 112 to verify if the public key of the recipient is available implies verification of public databases of certificates, for example by checking within repositories on the Internet that store available public keys. In a preferred embodiment, the encryption gateway checks during test 112 if the recipient uses an identical or equivalent relay for storing and managing keys; if this is the case, public keys will be exchanged seamlessly, without the sender or recipient necessarily noticing it. The outgoing email is then encrypted with the retrieved key which is also stored in the database 160.

When no public key of the recipient is available, for example the first time an internal sender within the company sends a secured email to this recipient, an optional notification may be sent by the encryption system 16 to the sender, or to another reviewing party, to let him decide how the email should be processed and if it can be released. The sender may react to this notification, for example by answering it or by clicking on a link pointing to a Java servlet in its body, to indicate for example that the email should be sent unencrypted, or, encrypted through other means, or only made available over the webmail address, or sent to another address, or deleted, or (by default) that an enrolment message should be sent to the recipient, as will be described. In an embodiment, this notification is omitted.

The content of the email is then made available to the recipient during step 120 over a secured Webmail interface provided over the internal web server 164. The recipient can then access this content, including any attachment, over a secured Internet connection, for example using SSL and suitable authentication means. At the same occasion, an enrolment message is sent by email to the recipient during step 122.

Figure 4:
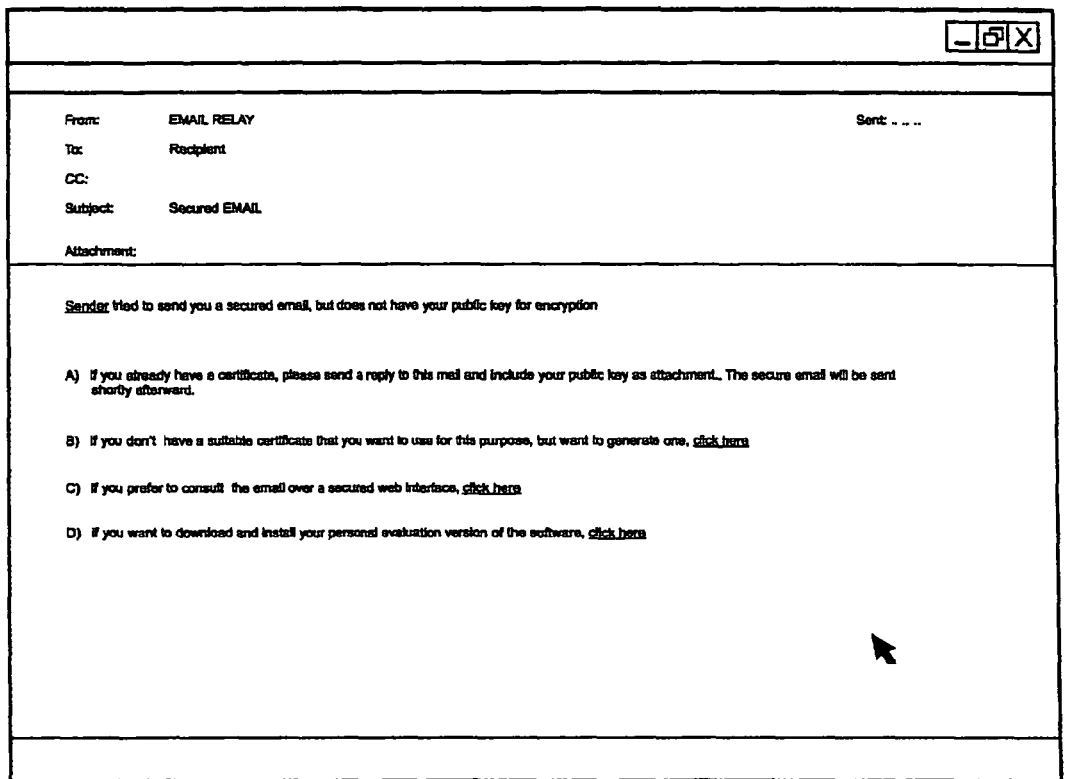
FIG. 4 shows an example of email inviting a recipient to decide whether he wants an incoming email to be secured.

An example of suitable enrolment message 1220 is illustrated on FIG. 4. Purpose of this enrolment message is to inform the recipient that the sender wants to establish a secure communication channel for emails, and to let the recipient decide on how the message should be secured. Accordingly, the enrolment message 1220 proposes several options the recipient can choose from by selecting a corresponding link in the email. The number of options provided may however depend on the email infrastructure of the recipient, which may have been learnt from previously received emails from this recipient, as will be described later.

According to a first possible option "A", the recipient can simply choose to retrieve the content of the email over the above mentioned Webmail interface, which can be directly accessed by simply following the hyperlink indicated in the email. The email is preferably removed from the buffer 161 as soon as the recipient has accessed it, and the process is stopped.

According to a second possible option "B", the recipient who does not have any suitable public key that he is ready to communicate to the sender for encryption of emails, he may decide to initiate the generation of a new certificate simply by following an appropriate link in the enrolment message, as will be explained below. This option may be omitted if the encryption system knows, for example from previous emails received from the recipient or from its email address, that the recipient is using an email client with no encryption capabilities, for example a Web-based email.

According to a third option "C", a recipient who already has a suitable certificate may simply communicate it with the sender who will then use it for encrypting the current and subsequent emails. This will be explained later. Again, this option may be omitted if the encryption system knows, for example from previous emails received from the recipient or from its email address, that the recipient is using an email client with no encryption capabilities, for example a Web-based email.

According to a fourth facultative option "D", a recipient may also decide to download a program, or a plug-in for his email client, that will offer him functionalities similar or identical to those of the encryption system 16 used by the sender. For example, the recipient may initiate the download and installation of a personal system for creating, managing and storing third parties certificates, and/or for enforcing email security policies. A recipient personal certificate may be generated and communicated to the sender during this process.

Alternatively, according to option "D", a recipient may decide to download a private key and a public key that were both generated in the gateway in a file, for example a PKCS#12 file, without any special plug-in.

Reverting to FIG. 3, if the recipient select option "C" during step 124, he will be required to send back to the email encryption system 16 a digitally signed reply, from which the encryption system extracts his public key (S/MIME or PGP). This key is stored in the database 160 on the sender's side and the recipient is automatically enrolled. The original message previously stored in the buffer 161 is encrypted with this public key during step 114, and forwarded to the recipient during step 116. This ends the process at step 118.

Figure 5:
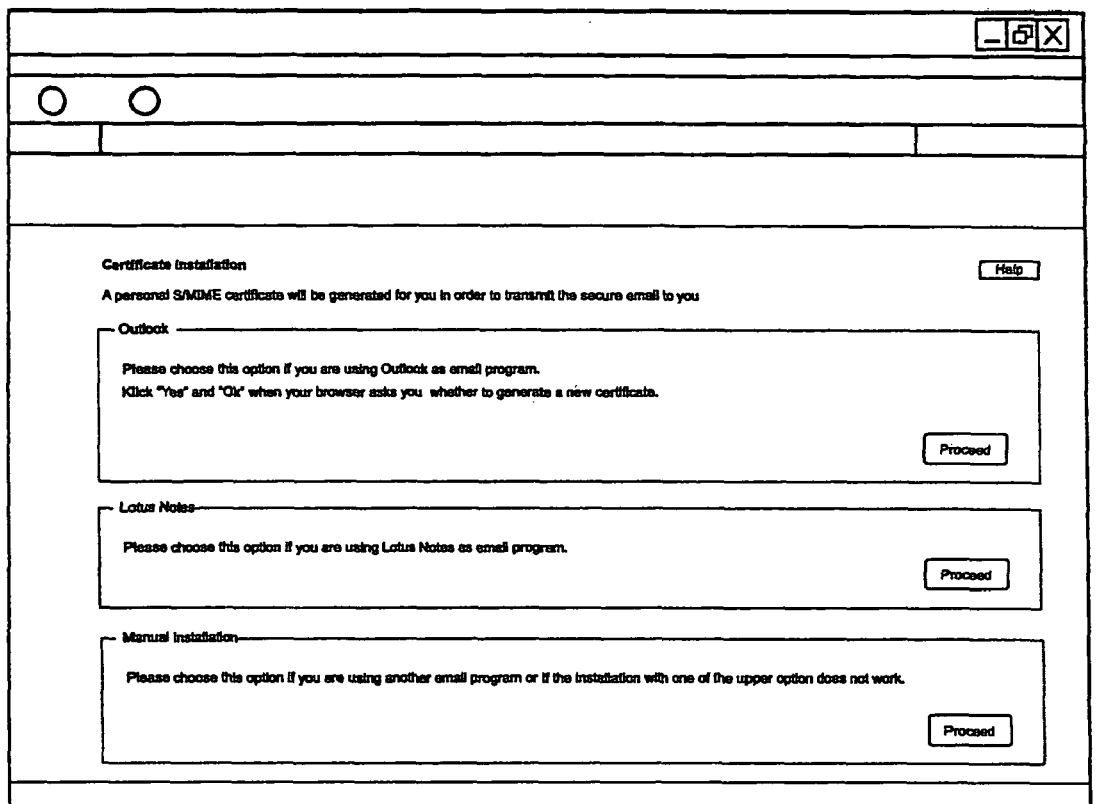
FIG. 5 shows an example of web form inviting a recipient to initiate the generation of a certificate.

If, on the other hand, the recipient does not send his certificate, but instead chooses option "B" and requests the generation of a new certificate, the certificate will be generated in collaboration between his email client and the certificate generator 162 on the sender's side. By following the link corresponding to this option, the recipient first initiates loading of a web form, adapted to the browser used by the recipient and similar to the example 1260 illustrated on FIG. 5.

On this figure, a confirmation is requested from the recipient who desires to install a new certificate. The web form may contain additional explanation and background information. The generation of the certificate may be adapted not only to the type of web browser used by the recipient, but preferably also to the type of email client he is using. The detection of the user's email client can happen automatically based on the headers of previous messages that went through the encryption system or manually by letting the user himself communicate what program he is using by choosing among the links of a Web page.

At the same time, the web form may prompt the recipient to indicate additional information (not shown) about the requested certificate, such as for example the length of the key, type, etc. Optionally, the recipient may be asked to pay for this new certificate, using any suitable Internet payment scheme for this purpose.

Figure 6:
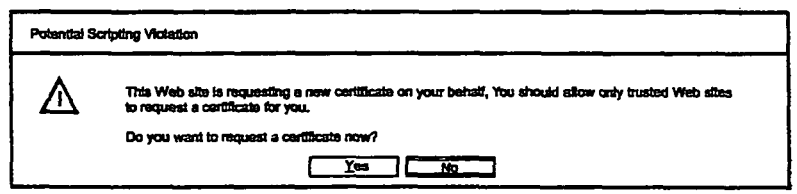
FIG. 6 shows an example of dialog box for requiring the confirmation of the recipient before generation of the certificate.
Figure 7:
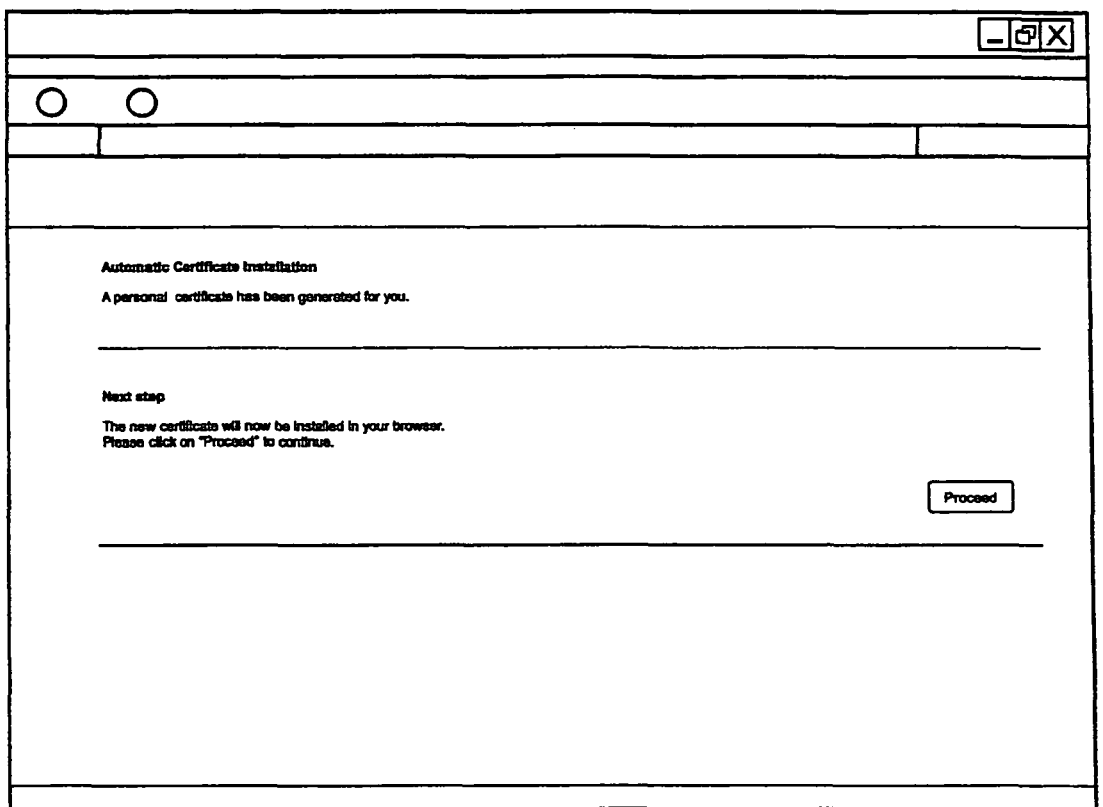
FIG. 7 is an example of a web form confirming the generation of a new certificate, and inviting the recipient to initiate installation of this new certificate.

Once the recipient proceeds by selecting an appropriate link on form 1260, a new dialog box illustrated as example on FIG. 6 is opened, asking for a new confirmation, as requested by existing browsers before generation of a new certificate. If the recipient selects "YES", a new pair of asymmetric keys is generated within the browser of the recipient, and the public key of the pair is automatically transmitted to the email relay at the sender's side. The generation of the certificate is then confirmed to the recipient, as illustrated by the example of web page illustrated on FIG. 7, and the certificate generator then ask the recipient if he wants to proceed by installing this certificate in his browser and in his email client.

In a preferred embodiment of the invention, a second key pair is generated in the encryption system during this process. The second key pair remains on the sender's side and all transmitted messages are also encrypted with the public key of this second pair. This second key pair may be used as a spare key pair for emergency situations, for example in order to allow decryption of emails sent to the recipient even if he has lost his private key. In this case, the system sends him the private key of the second pair and associates the corresponding public key to the recipient. In an embodiment, the spare private key is encrypted or otherwise protected so as to prevent abuse from the sender. The spare private key may for example correspond to a certificate that clearly indicates the nature of the key, or may need some supplementary protection, only known by the recipient, for decrypting it prior to its usage.

Figure 8:
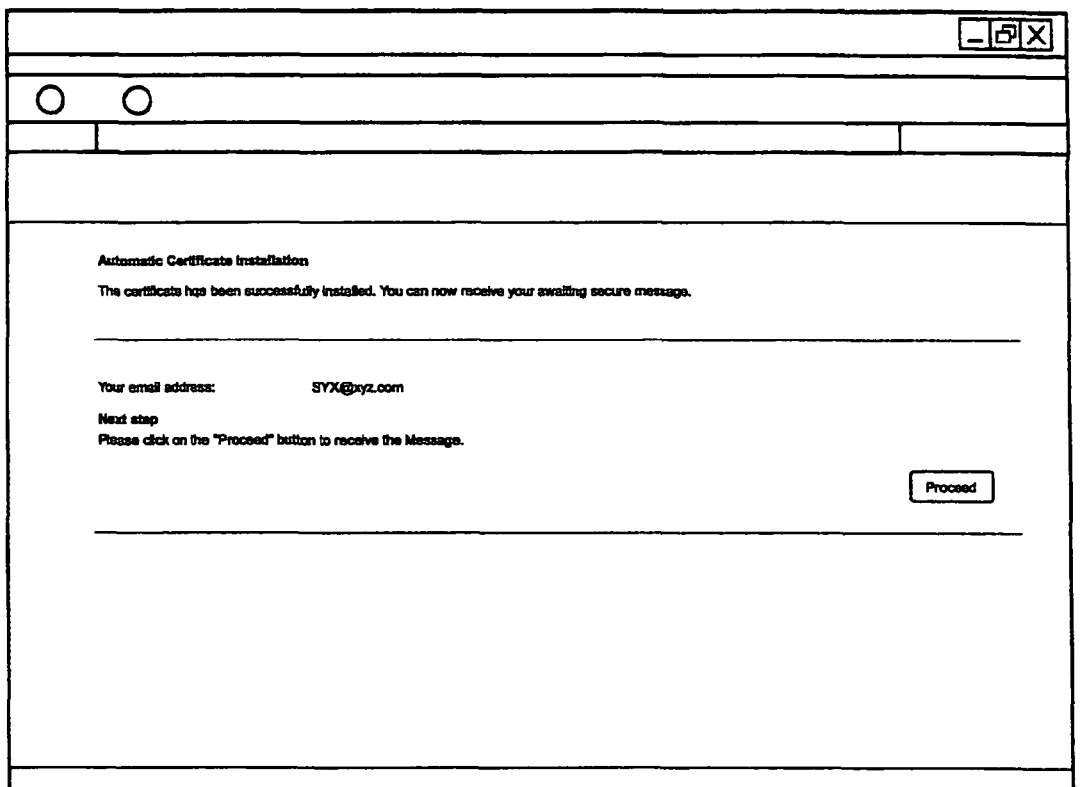
FIG. 8 is an example of a web form confirming the installation of the new certificate, and inviting the recipient to initiate the transmission of the secured email encrypted with this certificate.
Figure 9:
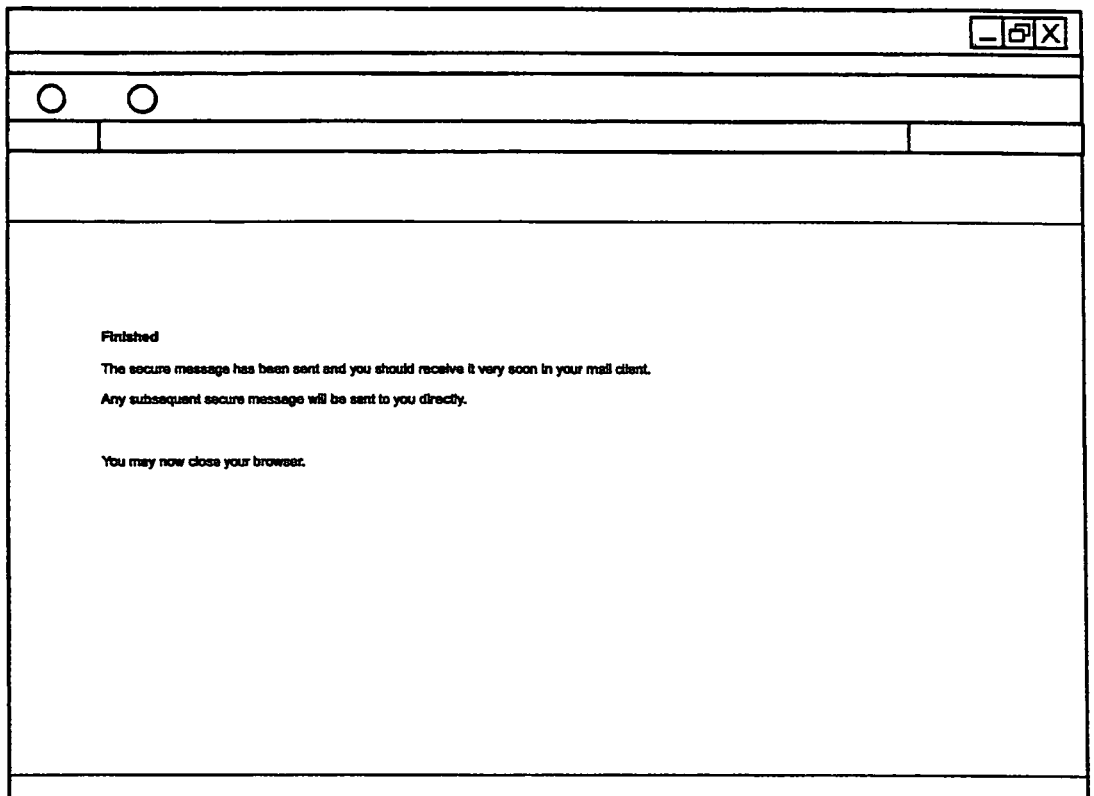
FIG. 9 is an example of a web page confirming the sending of the requested email secured with the certificate.

Once the certificate has been correctly installed on the recipient's side, a confirmation is displayed to the recipient, as illustrated on FIG. 8. The recipient may then retrieve the original message from the buffer 161 by selecting the button "Proceed". This initiates encryption of the message with the newly generated certificate (step 114 on FIG. 2) and transmission of this encrypted message to the recipient (116). A confirmation page, such as the one illustrated on the example of FIG. 9, is then displayed to the recipient.

As already mentioned, enrolment of new recipients in the database of the encryption system can be initiated not only when an internal sender sending an email to a new recipient, but also manually by any user, or possibly even by external user in a WAN. In an embodiment, a user may enrol a whole group of recipients, thus defining a group within which secure emails can be exchanged.

According to a first possible-scenario of group enrolment, an internal user would create a group and define the email addresses of its members by entering manually the email addresses of the members in a Web page offered by the encryption system 16, by sending an email containing a list of email addresses to an email address managed by the encryption system, or by transmitting this list of members by any other possible means.

The group members that are not already known in the database would receive an enrolment message with all, or some of, the options A to D above. All group members, including those previously registered in the database, would also receive an email with an attached file containing a list of email addresses, and possibly certificates, of all group members, in a format that can be directly imported in the member's address books. The list of address also contains an entry allowing sending of secure emails to the whole group, as well as an individual entry for each group member. The email addresses corresponding to each member of the group would preferably be a special address belonging to a mail domain of the encryption system. The addresses could typically look like: (member identifier).(group_name)@company_using_thesystem.com where "member identifier" would be based on a member's email address.

Messages sent by any group member over these special addresses are thus relayed by the encryption system 16 that decrypts the emails and then individually re-encrypted them with the appropriate encryption method for each of the message recipients.

This allows group members (whether they are internal users or S/MIME/PGP/webMail recipients) to very comfortably and securely exchange messages with the whole group. They also get all the individual contact details to be directly imported in their mail client address books to individually contact the group members over the encryption system 16.

New members can be added at a later stage to an existing group using the same mechanisms for introducing their address in the encryption system and for enrolling them with the above mentioned enrolment messages. It is also possible to remove members from a group or to deactivate them.

According to a second possible scenario, group enrolment may be offered as a service with a server, for example a server in the internet, offering some interaction over Web pages but without necessarily requiring an internal encryption system and a distinction between internal and external users. This configuration may be used for example by a user (the "group creator") who wants to discuss some topics with a group of friends, relatives or potential partners. He would go to a web page of a server, log in, and access a web page where he can introduce addresses of a group, or transit this list of addresses to the encryption system through any other possible way, as described above. He can then optionally also choose a password for the authentication of each member of the group. Each member of the group receives then an email prepared by the server and inviting him to install a certificate. Installation will however be performed once the user has entered the password that was previously transmitted to him over another channel, for example per phone, sms, fax, mail etc in case one was chosen by the group creator. The members already possessing an adequate certificate would send it back by replying to the enrolment email. As soon as all group members have created their certificate (or uploaded an existing one), all members get an email containing all the individual contact details to be directly imported in their mail client address books, including the certificates. They also get a group address to send messages to the whole group.

In this scenario, the group member's mail clients, or a device not being part of the described encryption server 16, directly encrypts and sends the messages to every member of the group. The emails don't go over the encryption system 16 described here. They are encrypted directly in the sender's email program with the certificates stored in the local address book. This has the drawback that all the members of a group must use the same encryption technology (for example all must use S/MIME, or all PGP etc).

In case some "untrusted" (because their certificate authority is not listed as trusted) certificates are sent back during the members registration, the group creator is notified per email and has to log into the group management Web page on the server to manually take a decision about the trustworthiness of the certificate.

In a preferred embodiment of the invention, the encryption system 16 tries to actively learn the information about the email infrastructure of the senders of all inbound emails even before being asked to send a secure message to them for the first time. It typically tries to find out what email clients they are using and possibly what type and version of antispam/antivirus tools are used by the recipient, since some of them are known to damage S/MIME signed emails. This analysis is possible because in a typical secure email gateway installation, all inbound and outbound messages go over the gateway, not only the signed or encrypted ones. This would allow the encryption system to personalize any type of further enrolment process to be generated later depending on the email environment of the recipient. For example, somebody using a Web-based email service with no encryption capabilities—like Hotmail (registered trademark)—would receive a modified enrolment message with only one option: reading his messages in the gateway's webmail (option A). The recipient would not be offered at all to install or send back a certificate.

This pre-enrolment process is done in such that for each sender of an inbound message the encryption system 16 would look if an email header identifying the mail program that created the message is present. If it is the case, the encryption system 16 would store this information in its user store, associated with the user's email address. If a user uses multiple email clients, the system would store the information about all of them. The user store is typically a table in an SQL database, but can as well be a directory (LDAP, Active Directory, etc). The encryption system may also check if some tags in the email indicate usage of a specific email or anti-spam system. The encryption system could also use the gathered information for purposes not related to security, including for CRM purposes.

The analysis of the headers of the emails is preferably based on comparisons with patterns stored in an external file that may be easily updated at any time, for example an XML file, possibly an XML file stored on or synchronized with a web server outside the gateway system 16.

When analyzing an incoming email, the encryption system 16 compares its headers with all the patterns listed in the XML definition file. As soon as a match is found, the process is interrupted and the sender email client considered to have been identified.

There are two options for storing the information about the type of email client used by the recipient: per user or per domain. Storing the mail client information for every user provides the highest accuracy, but the data volume can grow a lot for bigger organizations receiving millions of emails a day. The second option is to store the email client information only once per domain. For companies with mixed infrastructures, both mail client types are stored. Preferably, an option in the software of the encryption system 16 allows the administrator to choose the most appropriate way to store the information.

In some cases, the type of email client used by the recipient may be derived directly from its email address, for example when the address corresponds to a known web-based mail system.

The answer to the enrolment message can also be automatic, i.e. generated by a compatible device which can be running on the recipient's computer or as a gateway in his email infrastructure. This can be either by sending back a public key or by generation a certificate without any intervention of the human recipient. The latter would happen after some kind of automatic authentication of the server requesting the new certificate generation, for example through a server certificate.

In this case, the enrolment message is preferably marked with a machine-readable tag, so that not only humans reading the email text body can recognize it as being an enrolment message. This tag can typically be a special header added to the email, but it could also be some data in the body of the message or in an attachment, like XML code for example. If a compatible secure email handling module on the recipient's side recognizes such a tag, it sends back the requested user certificate automatically. This would automatically generate option "C" described above. In case the encryption system 16 on the sender's side does not trust (based on the list of certificate authorities he was configured to trust) the certificate automatically sent back by the email handling module on the recipient's side, it can answer with an automatically generated message to inform the recipient, again storing the information that the certificate rejected in a header, in an XML attachment, etc. In case the rejection of the certificate is temporary, the encryption system on the sender's side could also inform the recipient (still using the same mechanisms) when the certificate is finally accepted, typically after some human intervention took place to verify its authenticity.

In case the email handling module on the recipient's side wants a certificate to be generated by the encryption system 16, it can either simply ask for it by sending back the appropriate email header, XML data as attachment etc. In this case, the encryption system 16 would generate a public and a private key and send back the certificate generated using the public key. Or if the email handling module on the recipient's side wants to generate the keys itself (more secure since the private key is known by no one else), it would send back an attachment containing the public key, for example in the PKSC#10 format. In another embodiment, the encryption system 16 with the encryption system is installed in the local network of an Internet service provider and used for securing the emails forwarded from or to its customers. In another similar embodiment, the encryption system 16 is installed in the local network of an external email service provider, which may be different from the Internet Service Provider.

The invention also relates to a computer product including a program for performing the encryption method when the product is loaded in the encryption system 16 and the program is run by encryption system.

The invention claimed is:

1. A method for establishing a secure e-mail communication channel between a sender and at least one recipient, including the steps of:
   sending an enrollment message from an encryption system on the sender's side to said recipient, said enrollment message containing an invitation for said recipient to choose among different options; and
   said system providing each of the alternative options to the recipient:
      i) accessing to said e-mail over a secured web mail interface, and
      ii) sending a reply to said encryption system from which the public key of said recipient can be extracted, and
      iii) initiating generation of a public key on the recipient's side,
   wherein the options transmitted in said enrollment message; and
   said system accepting a response from said recipient indicating which of said options are chosen for execution by said system.

2. The method of claim 1, wherein:
   1) said system accepts, from said sender, an e-mail addressed to said recipient over said email encryption system,
   2) said encryption system verifies in a database of recipients if a public key of said recipient is available,
   3) if said public key of said recipient is available, said encryption system encrypts said email with said public key, and forwards the encrypted email to the recipient, and 4) if said public key of said recipient is not available in said database, said encryption system sends instead said enrollment message to said recipient.

3. The method of claim 2, wherein said encryption system first verifies if said email fulfils conditions for encryption previously defined by the administrator of said encryption system and forwards the email without encrypting it if the email does not fulfil said conditions.

4. The method of claim 2, wherein during said step 4, the encryption system sends a notification by email to said sender, or to another party, to let him decide if he wants an enrollment message to be sent to the recipient, or if he prefers his email to be sent unencrypted to said recipient.

5. The method of claim 4, wherein said sender replies to said notification by clicking on a link in the body of the notification, or by answering to said notification.

6. The method of claim 1, wherein:
1) said system accepts, from said sender, list of recipients in said encryption system,
2) said encryption system verifies in a database of recipients if the public key of said recipients are available,
3) said encryption system sends enrollment messages to recipients whose public keys are not available in said database.

7. The method of claim 6, wherein all recipients in said list further receive an address book entry for their email client to send messages to all the other recipients in said list.

8. The method of claim 6, wherein said list of recipients is entered over a web page on said encryption system.

9. The method of claim 6, wherein said list of recipients is entered as a file, such as XML file, a comma-separated file, a spreadsheet file, as a list of entries from a LDAP or active directory, or as a list of entries retrieved from a database.

10. The method of claim 1, wherein generation of said public key implies cooperation of said encryption system with a client application on the recipient's side.

11. The method of claim 1, comprising a step of generation of said public key and of a corresponding private key, said public key being made available to said encryption system and said private key being made available to the recipient's side only.

12. The method of claim 1, wherein said client application is a web browser.

13. The method of claim 12, wherein the process of generation of a public key depends on the web browser used by the recipient.

14. The method of claim 1, wherein the process of generation of a public key depends on the email client used by the recipient.

15. The method of claim 14, wherein the number of said options offered to said recipient in said enrollment message depends on the email client used by said recipient.

16. The method of claim 15, wherein said encryption system determines said email client from emails previously received from said recipient.

17. The method of claim 14, wherein said encryption system stores at least the email addresses of at least some recipients even before an encrypted email is sent to them.

18. The method of claim 14, wherein said encryption system stores information about the email client used in different domains of said recipients.

19. The method of claim 14, wherein said encryption system stores information about the email client used by individual recipients.

20. The method of claim 2, further comprising a step wherein said public key extracted from said reply or whose generation is initiated is stored in a database and used for encrypting said email and forwarding it to said recipient.

21. The method of claim 2, wherein, if said public key of said recipient is not available in said database, said encryption system tries to retrieve it from a central directory on the World Wide Web and/or from an email relay at the recipient's side.

22. The method of claim 1, wherein said enrollment message contains a first hyperlink to said web mail, and a second hyperlink to a web page allowing said recipient to initiate said generation of a public key.

23. The method of claim 1, wherein said enrollment message contains an option allowing said recipient to install a software for managing encryption keys.

24. The method of claim 1, wherein said enrollment message contains an option allowing said recipient to download a private key and a public key.

25. The method of claim 1, wherein said emails are signed with the private key of said sender.

26. The method of claim 25, wherein said emails are signed in said encryption system.

27. The method of claim 1, wherein generation of said public key implies cooperation of said encryption system with a browser on the recipient's side, said method comprising a step of automatic detection of said browser in said encryption system.

28. The method of claim 1, wherein a second key pair is generated in the encryption system and used as a spare key pair.

29. The method of claim 1, wherein said enrollment message is marked with a machine-readable tag so that a software on the recipient's side can automatically answer said enrollment message.

30. The method of claim 1, wherein said encryptions system performs at least one of the following actions on outgoing e-mails, before encryption: scanning for viruses, spam filtering, and content filtering.

31. The method of claim 1, further comprising a step during which said encryption system checks a predefined set of rules to verify which emails must be encrypted and/or signed.

32. The method of claim 1, wherein said encryption system is operated by the network administrator of a local area network and encrypts mails sent by a plurality of senders in said local area network.

33. An email encryption system for securing emails sent by a sender to a recipient, comprising:
an email relay for relaying emails;
a database of recipients for storing public key of said recipients;
a cryptographic module for encryption outgoing emails to said recipients using their public keys;
a SSL secured Webmail server for delivering outgoing emails over a secured web interface;
an infrastructure for generating new pairs of keys for new recipients requesting it;
an encryption system providing each one of the following alternative options:
  i) accessing to said e-mail over a secured web mail interface, and
  ii) sending a reply to said encryption system from which the public key of said recipient can be extracted, and
  iii) initiating generation of a public key on the recipient's side;
wherein the options transmitted in an enrollment message to said recipient; and
a module for replacing outgoing emails sent to external recipients for which no public key is available by an invitation to generate or deliver a key.

34. Computer product including a program for performing the method of claim 1 when said product is loaded in an encryption system and said program is run by said encryption system.

35. A method for establishing a secure e-mail communication channel between a sender and at least one recipient, including the steps of:
- sending an enrollment message, by an encryption system on the sender's side, to said recipient, said enrollment message containing an invitation for said recipient to choose among several options, including an option to generate a public key on the recipient's side,
- wherein generation of said public key implies generation of a corresponding private key made available to said recipient and of a spare private key made available to said sender,
- wherein the private key and the spare private key both correspond to said public key.

36. A method for establishing a secure e-mail communication channel between a sender and at least one recipient, including the steps of:
1) said sender sending an e-mail addressed to said recipient over said email encryption system,
2) an encryption system on the sender's side first verifying if said email fulfils conditions for encryption previously defined by the administrator of said encryption system and forwarding the email without encrypting it if the email does not fulfil said conditions,
3) if the email does fulfil said conditions, said encryption system verifying in a database of recipients if a public key of said recipient is available, and, if said public key of said recipient is available, said encryption system encrypting said email with said public key, and forwarding the encrypted email to the recipient,
4) if a public key of said recipient is not available, said encryption system sending an enrollment message to said recipient, said enrollment message containing an invitation for said recipient to choose among different alternative options; and
5) said system providing each one of said alternative options when said public key is not available, said alternative options including:
   i) accessing to said e-mail over a secured web mail interface, and
   ii) sending a reply to said encryption system from which the public key of said recipient can be extracted, and
   iii) initiating generation of a public key on the recipient's side;
wherein the options transmitted in said enrollment message to said recipient.

37. A method for sending encrypting messages, comprising:
1) storing a list of recipients in a database in an encryption system, said list comprising an email address and a cryptographic key of recipients,
2) said encryption system verifying in a database of recipients if the cryptographic key of a recipient to which an outgoing email is sent is available, and
3) said encryption system replacing said outgoing email by an enrollment message when said cryptographic key is not available in said database, said enrollment message containing several options, said options including providing said recipient with an option to share a cryptographic key with said database and alternatively providing said recipient with the option to retrieve said email over a secure webmail.

38. A method for establishing a secure e-mail communication channel between a sender and at least one recipient, comprising the step of said sender sending an e-mail addressed to said recipient over said email encryption system, and further comprising the steps of: an encryption system on the sender's side first determining if said email fulfils conditions for encryption previously defined by the administrator of said encryption system, and, depending on results of said determining, performing at least one of the following steps:
1) forwarding the email without encrypting it if the email does not fulfill said conditions,
2) if the email fulfils said conditions, said encryption system verifying in a database of recipients if a public key of said recipient is available, and, if said public key of said recipient is available, then
   a) said encryption system encrypts said email with said public key, and forwards the encrypted email to the recipient, otherwise, if said public key is not available, then
   b) said encryption system provides a plurality of alternative options including:
      i) providing the recipient access to said e-mail over a secured web mail interface, and
      ii) said encryption system accepting a reply from said recipient from which the public key of said recipient can be extracted, and
      iii) initiating generation of a public key on the recipient's side for said recipient;
and
said system accepting a response from said recipient indicating which of said plurality of alternative options are chosen for execution by said system.

\* \* \* \* \*